United States Patent
Vande Haar

(10) Patent No.: US 12,460,685 B1
(45) Date of Patent: Nov. 4, 2025

(54) PISTON CLUTCH

(71) Applicant: DEERE & COMPANY, Moline, IL (US)

(72) Inventor: William J. Vande Haar, Janesville, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/987,472

(22) Filed: Dec. 19, 2024

(51) Int. Cl.
*F16D 25/0638* (2006.01)
*F16D 48/02* (2006.01)

(52) U.S. Cl.
CPC ......... *F16D 25/0638* (2013.01); *F16D 25/14* (2013.01); *F16D 2500/1027* (2013.01)

(58) Field of Classification Search
CPC .... F16D 25/0638; F16D 13/52; B60W 10/119
See application file for complete search history.

(56) References Cited

U.S. PATENT DOCUMENTS

| | | | |
|---|---|---|---|
| 3,384,214 A * | 5/1968 | Wilson | F16D 21/04 192/48.613 |
| 4,020,933 A * | 5/1977 | Gill | F16D 25/10 192/109 F |
| 5,183,131 A | 2/1993 | Naito | |
| 7,386,382 B2 | 6/2008 | Seksaria et al. | |
| 8,327,992 B2 | 12/2012 | Miyazaki et al. | |
| 8,504,249 B2 | 8/2013 | Miller et al. | |
| 8,504,250 B2 | 8/2013 | Reiter et al. | |
| 10,207,581 B2 | 2/2019 | Lubben et al. | |
| 11,370,406 B2 | 6/2022 | Runde et al. | |
| 11,491,970 B2 | 11/2022 | Nahidi et al. | |
| 11,613,177 B2 | 3/2023 | Neumann et al. | |
| 2017/0241487 A1 * | 8/2017 | Sasahara | F16D 13/52 |
| 2018/0202501 A1 * | 7/2018 | Park | F16D 25/10 |
| 2022/0017069 A1 * | 1/2022 | Glück | B60K 6/48 |

FOREIGN PATENT DOCUMENTS

| | | | |
|---|---|---|---|
| CN | 110953260 A | 4/2020 | |
| DE | 102021126114 A1 * | 4/2023 | B60K 17/165 |
| EP | 2962006 B1 * | 3/2020 | F16D 25/14 |
| JP | H05340430 A | 12/1993 | |

\* cited by examiner

Primary Examiner — Stacey A Fluhart

(57) ABSTRACT

A hydraulic clutch of a work vehicle includes a clutch pack, a drum, a hub, a first piston, a piston guide, and a second piston. The first piston has a first end wall and a first engaging portion extending axially from the first end wall toward the clutch pack. The piston guide has a guide body extending axially from a closed end of the drum, passing through the first end wall of the first piston, and extending radially to an inner periphery of the first piston to form a chamber wall. The second piston is disposed on another side of the chamber wall and has a second end wall and a second engaging portion extending axially from the second end wall toward the clutch pack.

19 Claims, 10 Drawing Sheets

PISTON CLUTCH

TECHNICAL FIELD

The present disclosure relates generally to a clutch of a work vehicle.

BACKGROUND

A clutch is an element of a powertrain of a work vehicle. It may be used to connect and disconnect power between a power source (e.g., an engine) and a receiver (e.g., a transmission or other driveline component). The work vehicle, such as a tractor, has a mechanical front wheel drive clutch (MFWD clutch). During a sharp turn, the MFWD is generally disengaged to disconnect the power flow from a transmission to the front axle.

SUMMARY

According to an aspect of the present disclosure, a hydraulic clutch of a work vehicle comprises a clutch pack, a drum, a hub, a first piston, a piston guide, and a second piston. The clutch pack has a spacer plate and a friction disk. The drum is configured to rotate about an axis with a first shaft coaxially mounted on and being splined on an inner periphery of the drum to receive the spacer plates. The hub is configured to rotate about the axis, is disposed within an interior of the drum, is coupled to a second shaft, and is splined to receive the friction disk arranged alternatively with the spacer plate. The first piston has a first end wall and a first engaging portion extending axially from the first end wall toward the clutch pack and is configured to move toward the clutch pack to engage the spacer plate and the friction disk or is configured to move away from the clutch pack to disengage the spacer plate and the friction disk. The piston guide has a guide body extending axially from a closed end of the drum, passing through the first end wall of the first piston, and extending radially to an inner periphery of the first piston to form a chamber wall. The chamber wall and the first end wall of the first piston form a first chamber which is variable in response to a movement of the first piston. The second piston is disposed on another side of the chamber wall, has a second end wall and a second engaging portion extending axially from the second end wall toward the clutch pack, and is configured to move toward the clutch pack to engage the spacer plate and the friction disk. The second piston and the piston guide form a second chamber which is variable in response to a movement of the second piston.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
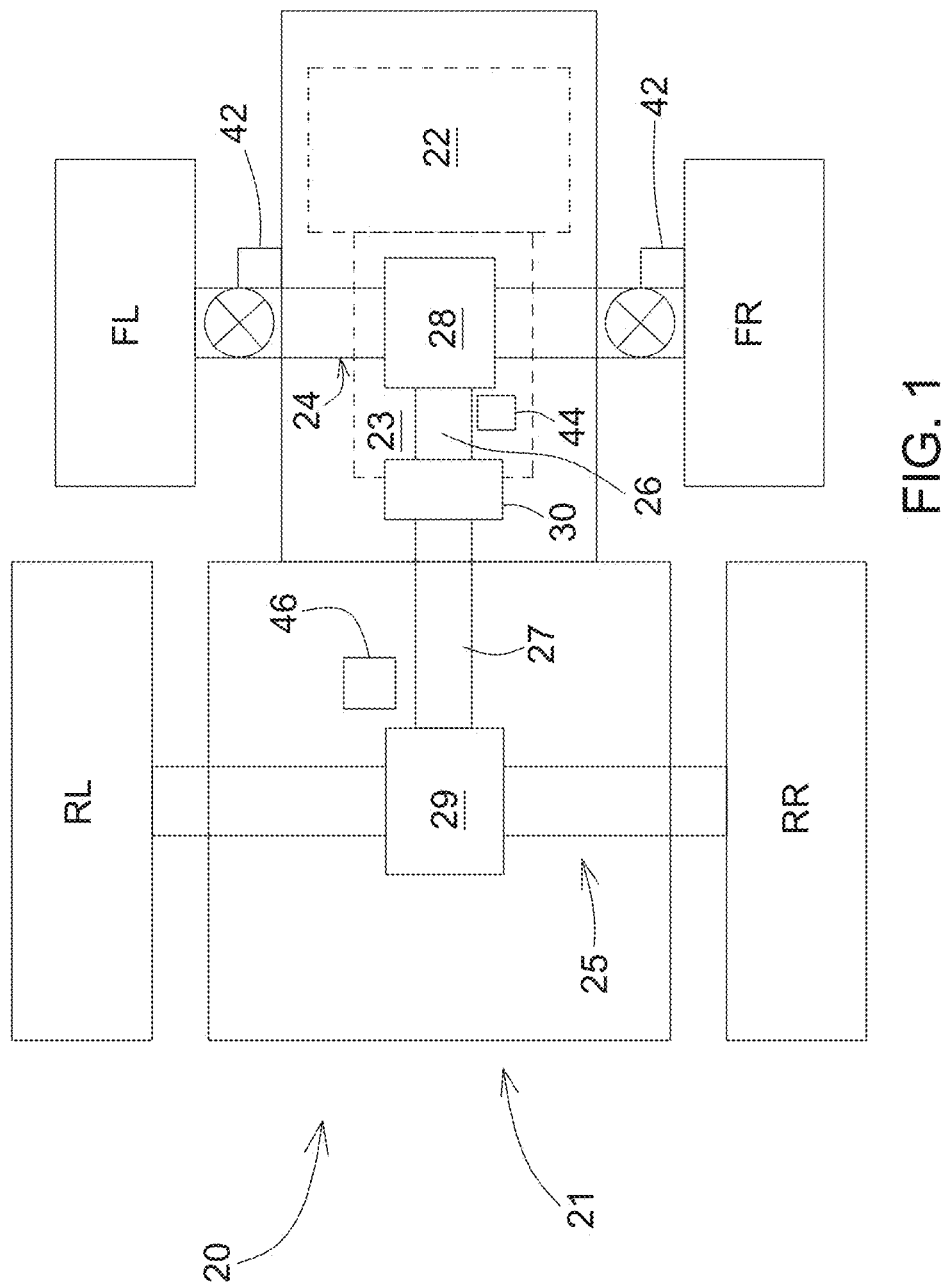
FIG. 1 is a schematic view of a drivetrain of a work vehicle in accordance with an embodiment of the present disclosure.

Referring to FIG. 1, a work vehicle 20, embodied as a tractor, normally includes a mainframe 21, a power source 22, and a transmission 23, a front axle 24, a rear axle 25, and a drive clutch 30. The mainframe 21 may carry the power source 22, other drivetrain components, and a cab. The work vehicle 20 is configured to produce a work vehicle traction force via the power source 22, such as an internal combustion engine (ICE) in a non-limiting example, through the transmission 23. In an embodiment, the transmission 23 is an infinitely variable transmission (IVT) or a continuously variable transmission (CVT), and, in a further embodiment, the transmission 23 is an electric infinitely variable transmission (eIVT). The transmission 23 is coupled to the power source 22 with an input shaft to receive power from the power source 22 and configured to transfer the power to the front axle 24 and the rear axle 25 (final drives). The transmission 23, in example embodiments, could be a power shift transmission, a range shift transmission, or a combination of a power shift and range shift transmission.

The front axle 24 is coupled to the transmission 23 with a front drive shaft 26. The front axle 24 is configured to receive at least a first portion of the power from the transmission 23. The front axle 24 is coupled to a front left wheel FL and a front right wheel FR, each of which is pivotable relative to the front axle 24 with a steering angle. The rear axle 25 is coupled to the transmission 23 with a rear drive shaft 27. The rear axle 25 is coupled to a rear left wheel RL and a rear right wheel RR. The rear axle 25 is configured to receive at least a second portion of the power from the transmission 23. A front differential 28 may be disposed between the front drive shaft 26 and the front axle 24 and a rear differential 29 may be disposed between the rear drive shaft 27 and the rear axle 25. The front differential 28 and the rear differential 29 can be open differentials, limited-slip differentials (LSD), locking differentials, or other types of differentials. When the work vehicle 20 is turning, the front differential 28 and rear differential 29 allow the wheels on the outside of the turn, in general, rotate faster than the wheels on the inside. The drive clutch 30 is operatively positioned between the rear axle 25 and the power source 22 and configured for selective engagement between a fully engaged position and a fully disengaged position to change the portion of the power from the transmission 23 to the rear axle 25. The drive clutch 30 may be included by or coupled to the transmission 23 and is configured to provide torque to the front drive shaft 26 and selectively provide torque to the rear drive shaft 27. The example embodiments of the drive clutch 30 will be described later.

Figure 2A:
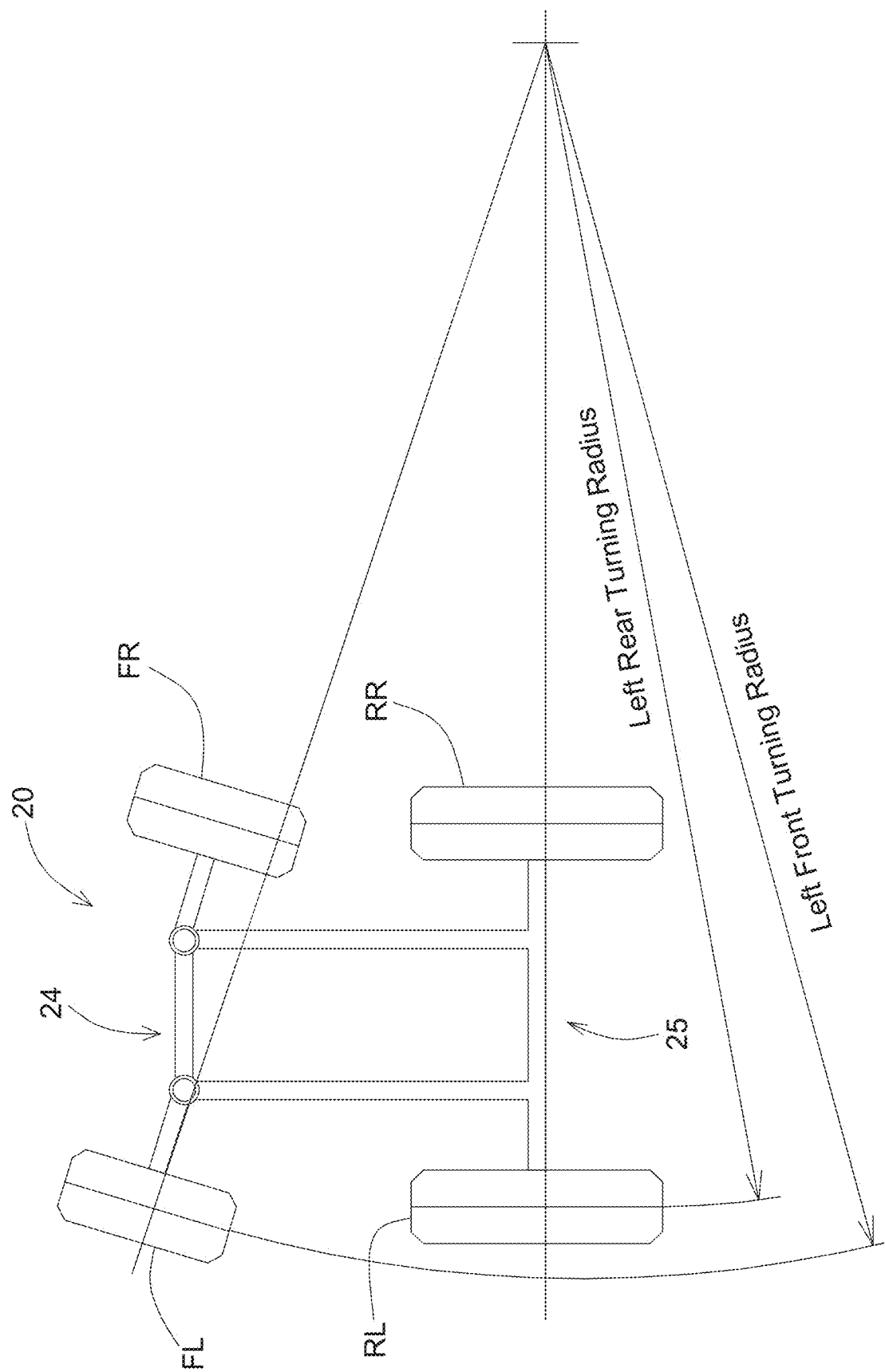
FIG. 2A is a schematic view of the work vehicle to demonstrate the front axle has larger turning radius than does the rear axle.
Figure 2B:
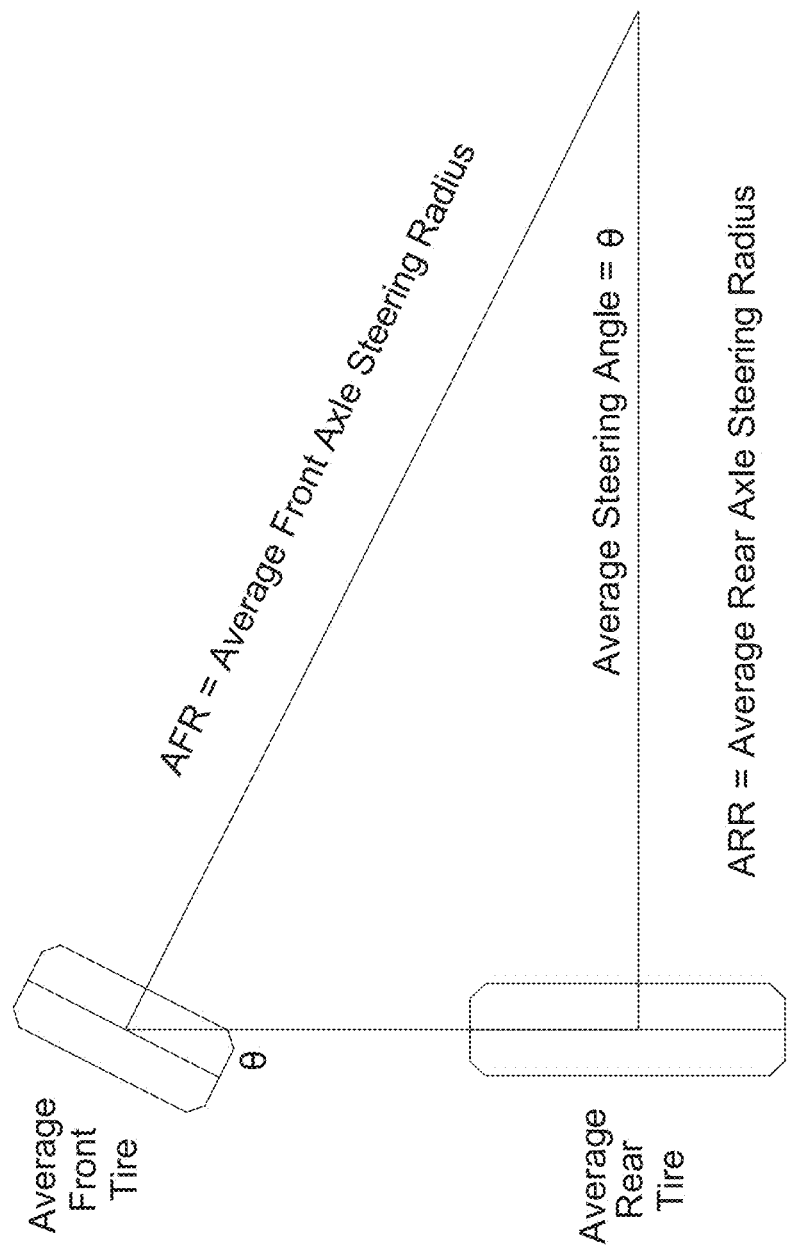
FIG. 2B demonstrates simulated average front and rear wheels, simulated average front axle steering radius and rear axle steering radius, and simulated average steering angle.
Figure 2C:
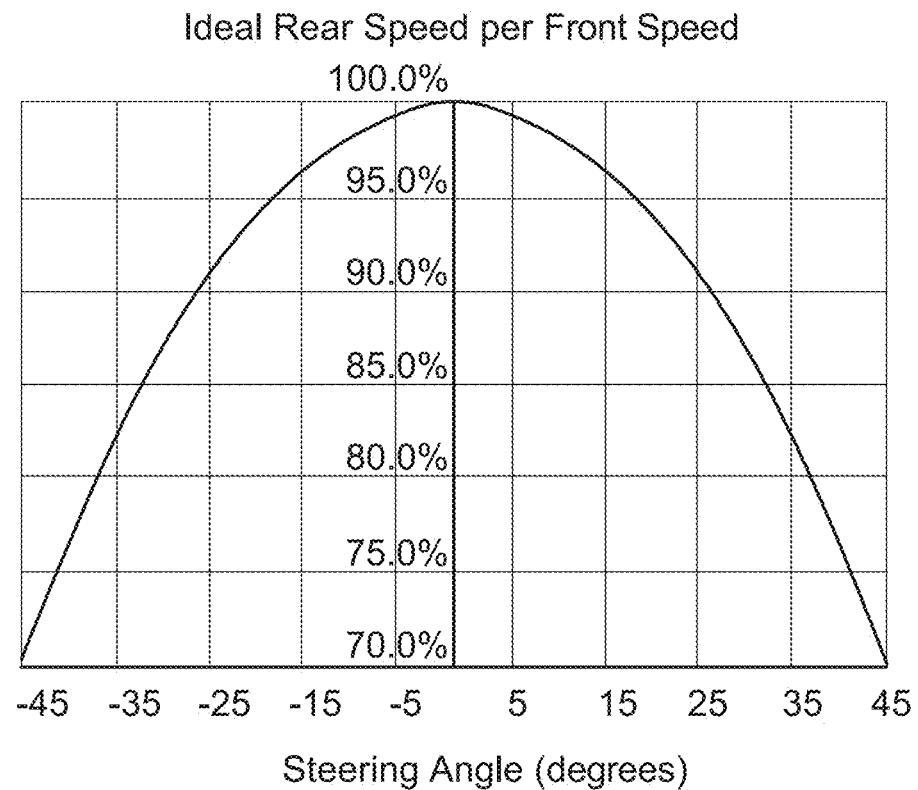
FIG. 2C is a graph having steering angle as independent variable and percentage of ideal rear wheel speed per front wheel speed as dependent variable.
Figure 2D:
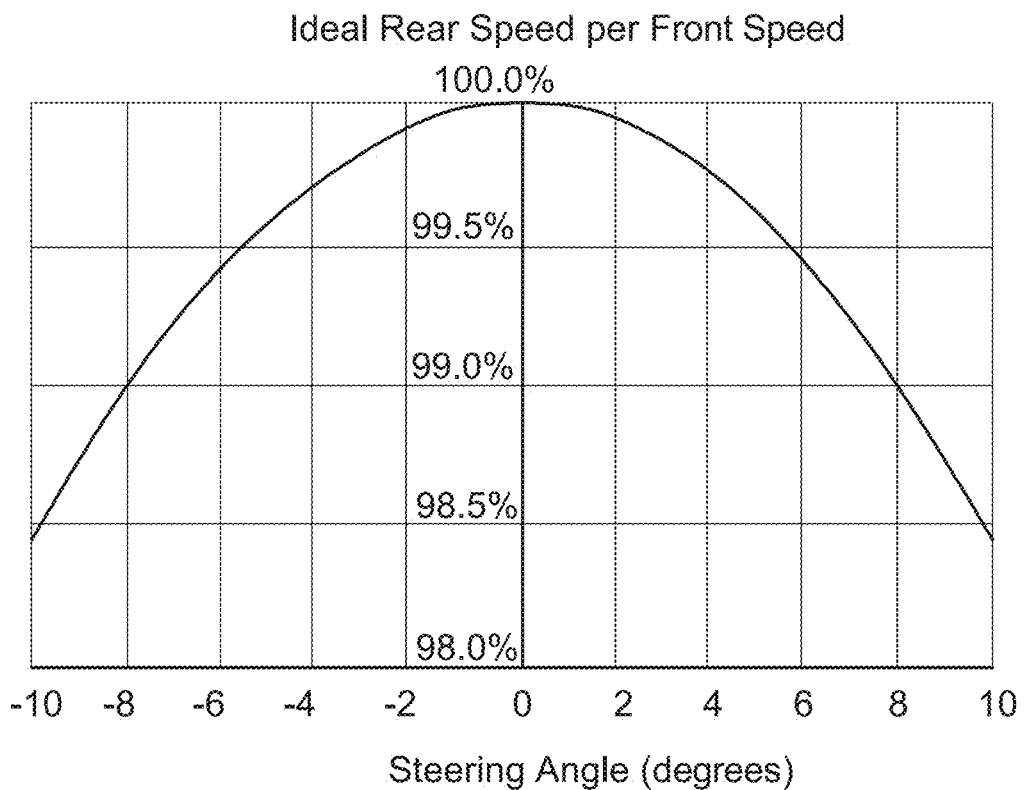
FIG. 2D is an enlarged graph of FIG. 2C that shows a deadband.
Figure 3:
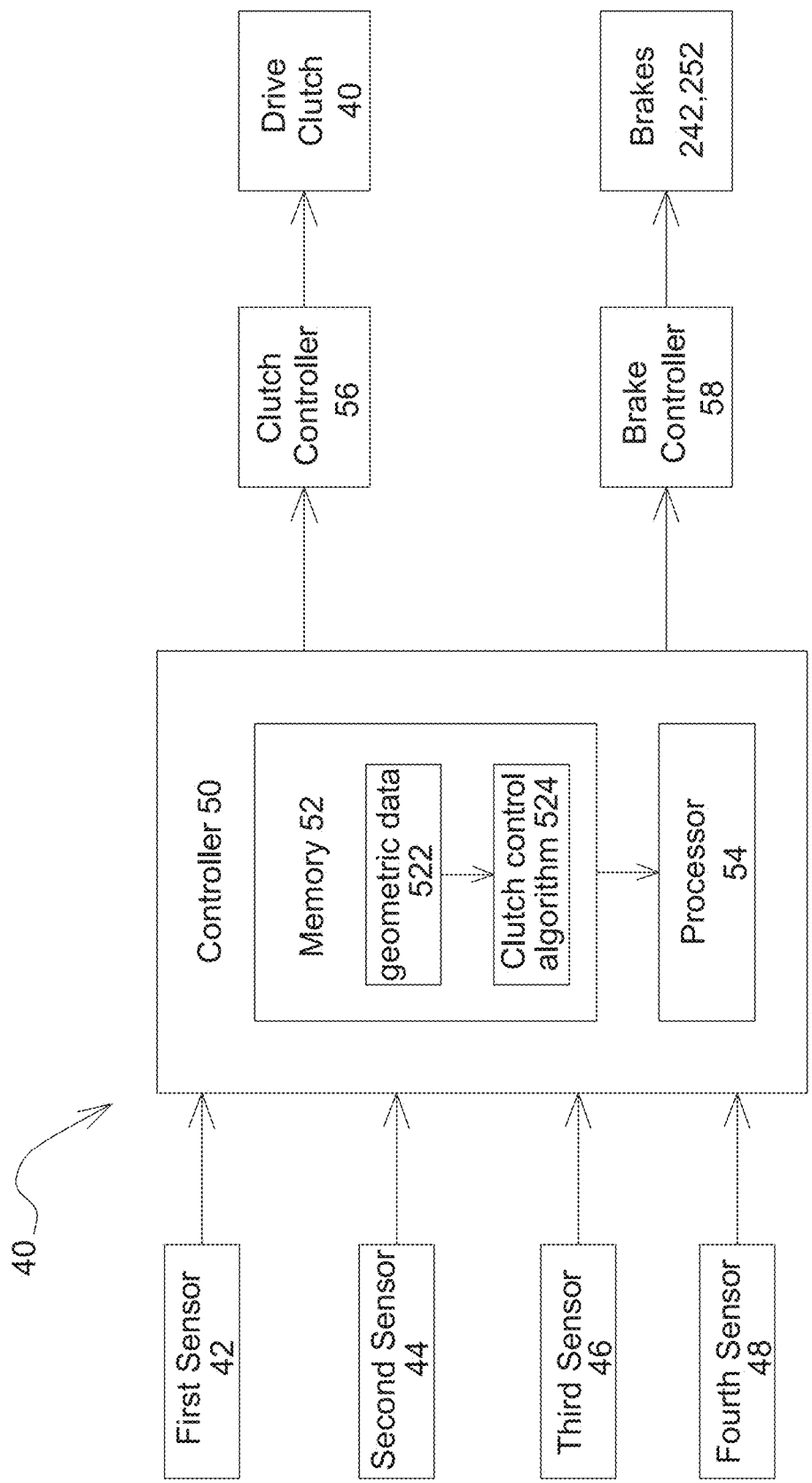
FIG. 3 is a schematic view of a rear wheel drive clutch control system of the work vehicle.

FIG. 2A is a schematic view demonstrates the front axle 24 has larger turning radius than does the rear axle 25. As shown in FIG. 2A, when the work vehicle 20 turns to the right, the front left wheel FL has a turning radius larger than the rear left wheel RL. Similarly, the front right wheel FR has a turning radius larger than the rear right wheel RR. Because the work vehicle 20 turns the front wheels FL, FR which travel lager distances than the rear wheels RL, RR (comparison on the same left or right side), ideally the speed of the front left wheel FL is faster than the speed of the rear left wheel RL and the speed of the front right wheel FR is faster than the speed of the rear right wheel RR. As such, all of the tires provide appropriate traction, ideally. The following mentioned the speed of the front wheels or front wheel speed may refer to the average front wheel speed; the speed of the rear wheels or rear wheel speed may refer to the average front wheel speed. Based on the steering angle and the geometry data of the work vehicle 20, the ideal rear turning radius and ideal front turning radius can be calculated by a controller 50 (FIG. 3). FIG. 2B demonstrates simulated average front and rear wheels, simulated average front axle steering radius AFR and simulated rear axle steering radius ARR, and simulated average steering angle. With the known average steering angle $\Theta$, which may be calculated by the controller 50 receiving signals from two first sensors 42 (FIG. 3) disposed adjacent to the front left wheel FL and front right wheel FR (or adjacent to the front axle coupled to the front left wheel FL and front right wheel FR), the simulated rear axle steering radius ARR divided by the simulated average front axle steering radius AFR can be determined by the controller 50. FIGS. 2C and 2D are graphs showing the relationship between the steering angle and the percentage of the desired (ideal) rear wheel speed per front wheel speed. The latter may be used by the controller 50 to adjust the engagement of the drive clutch 30, which is described later.

Referring to FIG. 3, the work vehicle 20 has a rear wheel drive clutch control system 40. The rear wheel drive clutch control system 40 may include a first sensor 42, a second sensor 44, a third sensor 46, the controller 50, a clutch controller 56, a brake controller 58. The work vehicle 20 may include two front brakes 242 (i.e., a front left brake and a front right brake) respectively disposed near the front left wheel FL and the front right wheel FR and two rear brakes 252 (i.e., a rear left brake and a rear right brake) respectively disposed near the rear left wheel RL and the rear right wheel RR.

The first sensor 42 includes at least one steering angle sensor, which is configured to measure the steering angle and transmit a signal indicative of the steering angle to the controller 50. The first sensor 42 may be disposed on or adjacent to a pivot point where the front left wheel FL or the front right wheel FR is pivotable relative to the front axle 24. In another example, the number of the steering angle sensor may be two and disposed on respective pivot points of the front left wheel FL and the front right wheel FR. In another example, the first sensor 42 may be a sensor that is disposed on a linkage between the steering wheel (not shown) and the front left wheel FL or the front right wheel FR and is configured to indirectly measure the steering angle by measuring the movement of the linkage, the signal of which can be used to calculate the steering angle by the controller 50.

The second sensor 44 is a speed sensor configured to measure a characteristic of a drivetrain component, such as a rotational speed of the front drive shaft 26, the front wheels (FL and/or FR) or front axle and transmit a signal indicative of the speed of the front wheels. The front wheel speed is equal to front axle rotational speed multiplied by rolling circumference of the front wheels. The controller 50 may calculate the front wheel speed based on the rotational speed of the front wheels and the rolling circumference of the front wheels. The location and the number of the second sensor 44 can be varies. In one example, as shown in FIG. 1, the second sensor 44 may be positioned on or near the front drive shaft 26 that is connected to the front differential 28. The rotational speed of the front drive shaft 26 can be used for the controller 50 to calculate an average speed of the front left wheel FL and the front right wheel FR. In another example, two speed sensors 46 may be respectively disposed near the front left wheel FL (or front left axle) and the front right wheel FR (or front right axle) and measure the rotational speed of the front left wheel FL (or front left axle) and the rotational speed of the front right wheel FR (or front right axle). The controller 50 may calculate the average speed of the front left wheel FL and the front right wheel FR based on the rotational speed of the front wheels and the rolling circumference of the front wheels. In another example, one speed sensor may be disposed near the front left wheel FL (or front left axle) or the front right wheel FR (or front right axle) and measure one of their speed. The controller 50 may calculate the speed thereof.

Likewise, the third sensor 46 is a speed sensor configured to measure a characteristic of another drivetrain component, such as a rotational speed of the rear drive shaft 27, the rear wheels (RL and/or RR) or rear axle and transmit a signal indicative of the speed of the rear wheels. The rear wheel speed is equal to rear axle rotational speed multiplied by rolling circumference of the rear wheels. The controller 50 may calculate the rear wheel speed based on the rotational speed of the rear wheels and the rolling circumference of the rear wheels. The location and the number of the third sensor 46 can be varies. In one example, as shown in FIG. 1, the third sensor 46 may be positioned on or near the rear drive shaft 27 that is connected to the rear differential 29. The rotational speed of the rear drive shaft 27 can be used for the controller 50 to calculate an average speed of the rear left wheel RL and the rear right wheel RR. In another example, two speed sensors 46 may be respectively disposed near the rear left wheel RL (or rear left axle) and rear right wheel RR (or rear right axle) and measure the rotational speed of the rear left wheel RL (or rear left axle) and the speed of the rear right wheel RR (or rear right axle). The controller 50 may calculate the average speed of the rear left wheel RL (or rear left axle) and the rear right wheel RR (or rear right axle) based on the rotational speed of the rear wheels and the rolling circumference of the rear wheels. In another example, one speed sensor may be disposed near the rear left RL wheel (or rear left axle) and the rear right wheel RR (or rear right axle) and measure one of their speeds. The controller 50 may calculate the speed thereof.

Optionally, the work vehicle 20 may include a fourth sensor 48. The fourth sensor 48 includes but is not limited to a radar or GPS. Based on signals from the fourth sensor 48, the controller 50 may calculate the ground speed of the work vehicle 20. The controller 50 may further determine whether there is a slip between the front wheels FL, FR and the ground and a slip between rear wheels RL, RR, and the ground, based on the ground speed of the work vehicle 20, the speed of front wheels and the speed of rear wheels.

The controller 50 is disposed in communication with the first sensor 42, the second sensor 44, the third sensor 46, the clutch controller 56, and the brake controller 58. The controller 50 is operable to receive signals indicative of the steering angle of the front wheels FL, FR from the first sensor 42, receive signals indicative of the speed of the front wheels FL, FR from the second sensor 44, receive signals indicative of the speed of the rear wheels RL, RR from the third sensor 46, receive signals indicative of the ground speed of the work vehicle 20 from the fourth sensor 48, and communicate a signal to the clutch controller 56 and optionally and a signal to the brake controller 58. While the controller 50 is generally described herein as a singular device, it should be appreciated that the controller 50 may include multiple devices linked together to share and/or communicate information therebetween. Furthermore, it should be appreciated that the controller 50 may be located on the work vehicle 20 or located remotely from the work vehicle 20.

The controller 50 may alternatively be referred to as a computing device, a computer, a controller, a control unit, a control module, a module, etc. The controller 50 includes a memory 52, a processor 54, and all software, hardware, algorithms, connections, sensors, etc., necessary to manage and control the operation of the first sensor 42, the second sensor 44, the third sensor 46, the fourth sensor 48, the clutch controller 56, and the brake controller 58. As such, a method may be embodied as a program or algorithm operable on the controller 50. It should be appreciated that the controller 50 may include any device capable of analyzing data from various sensors, comparing data, making decisions, and executing the required tasks.

As used herein, "controller 50" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 50 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 50 may be in communication with other components on the work vehicle 20, such as hydraulic components, electrical components, and operator inputs within an operator station of an associated work vehicle. The controller 50 may be electrically connected to these other components by a wiring harness such that messages, commands, and electrical power may be transmitted between the controller 50 and the other components. Although the controller 50 is referenced in the singular, in alternative embodiments the configuration and functionality described herein can be split across multiple devices using techniques known to a person of ordinary skill in the art.

The controller 50 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 52 may include any non-transitory/tangible medium which participates in providing data or computer-readable instructions. The memory 52 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 50 includes the tangible, non-transitory memory 52 on which may be recorded geometric data 522 of the work vehicle 20 and computer-executable instructions, including a clutch control algorithm 524. The processor 54 of the controller 50 is configured for executing the clutch control algorithm 524 to determine the engagement in the extent between the fully engaged position and a fully disengaged position of the drive clutch 30 based on the signal from the first sensor 42, the signal from the second sensor 44, the signal from the third sensor 46, and optionally, the signal from the fourth sensor 48. The clutch control algorithm implements a method of controlling the drive clutch 30 of the work vehicle 20, described in detail below.

The processor 54 is operable to execute the clutch control algorithm 524 to receive the signal indicative of the steering angle from the first sensor 42 to determine the steering angle. The processor 54 is operable to execute the clutch control algorithm 524 to determine an ideal rear turning radius and an ideal front turning radius based on the signal from the first sensor 42 and the geometric data 522 stored in the memory 52. The processor 54 is operable to execute the clutch control algorithm 524 to receive the signal indicative of the speed of the front wheels (FL and/or FR, or average therebetween) from the second sensor 44 to determine a measured front wheel speed. The processor 54 is operable to execute the clutch control algorithm 524 to determine a desired speed of the rear wheels based on the signal from the first sensor 42 and the signal from the second sensor 44. The desired speed of the rear wheel(s) can be calculated as:

$$\text{Desired Rear Wheel Speed} = \frac{\text{Ideal Rear Turning Radius}}{\text{Ideal Front Turning Radius}} \text{Measured Front Wheel Speed}$$

The equation may still work if the work vehicle 20 is designed to have the front wheel operate slightly faster than the rear wheel (i.e., the average front wheel speed is faster than the average rear wheel speed). In one implementation, the work vehicle 20, such as a tractor, may be designed to have approximately 2% to 4% overspeed at the front axle (front wheels) relative to the rear axle (rear wheels).

Referring to FIG. 2B, the desired rear wheel speed may be calculated based on the steering angle, which can be the average steering angle $\ominus$. The simulated rear axle steering radius ARR can be used for idea rear turning radius; the simulated average front axle steering radius AFR can be used for the ideal front turning radius. Because cos e is equal to the simulated rear axle steering radius ARR divided by the simulated average front axle steering radius AFR, the desired speed of rear wheel(s) can be calculated as:

Desired Rear Wheel Speed=Cos(steering angle)
*Measured Front Wheel Speed

Referring to FIGS. 2C, 2D, and Table 1-1 below demonstrate examples of steering angles that change desired (ideal) rear wheel speed per front wheel speed. In one implementation, it is not until the steering angle magnitude is greater than 10 degrees that the desired (ideal) rear axle speed becomes significantly less than the front axle speed. Therefore, a deadband, such as 10 degrees, may be used for the controller 50 to determine whether to the execute the clutch control algorithm 524 to change the clutch slip torque, which is described later. As described earlier, in some implementation, the work vehicle 20 (e.g., a tractor) may be designed to have from 2% to 4% overspeed for the front wheels (front axle). As shown in Table 1-1, by having overspeed from 2% to 4% for the front (wheel) speed, the steering may work up to about 10 degrees (an example of the deadband) of steering angle without the controller 50 changing the clutch slip torque. In another implementation, the work vehicle may be designed without overspeed for the front axle, the deadband may decrease to 7 or 8 degrees.

TABLE 1-1

| steering angle (degrees) | Ideal Rear Speed per Front Speed |
|---|---|
| 0 | 100.0% |
| 5 | 99.6% |
| 10 | 98.5% |
| 15 | 96.6% |
| 20 | 94.0% |
| 25 | 90.6% |
| 30 | 86.6% |
| 35 | 81.9% |
| 40 | 76.6% |
| 45 | 70.7% |

The processor 54 is operable to execute to receive the signal indicative of the speed of the rear wheels (RL and/or RR, or average therebetween) from the third sensor 46 to determine the (measured) rear wheel speed. The processor 54 is operable to execute the clutch control algorithm 524 to compare the desired speed of the rear wheels and the speed of the rear wheels and to output a control signal to a clutch controller 56 to change the engagement of the drive clutch 30 based on a result of comparing the desired speed of the rear wheels and the (measured) speed of the rear wheels. The clutch controller 56 is varied, depending on the types of the drive clutch 30. In a non-limiting example, when the drive clutch 30 is a hydraulic clutch, the clutch controller 56, controlled by the controller 50, may include one or more hydraulic flow control valve to adjust the hydraulic pressure of the drive clutch 30 to change the engagement thereof. The processor 54 is operable to execute the clutch control algorithm 524 to energize or deenergize the flow control valve (e.g., a first flow control valve 562 and second flow control valve 564 shown in FIGS. 4A, 4B) to adjust a hydraulic fluid entering the drive clutch 30. In another non-limiting example, when the drive clutch 30 is an electromagnetic clutch, the clutch controller 56, controlled by the controller 50, may include one or more power supply or other electronic element to adjust the electric current entering the drive clutch 30, which generates magnetic field of the drive clutch 30, to change the engagement thereof.

With the calculation of the desired rear wheel speed based on the signals from the first sensor 42 and second sensor 44 and the comparison between the desired rear wheel speed and the measured rear wheel speed based on the signals from the third sensor 46, the controller 50 can perform a closed-loop control to change the engagement of the drive clutch 30 and adjust the rear wheel speed to the desired rear wheel speed. In other word, the clutch slip torque (FIG. 4C), controlled by the controller 50, can be varied continuously from small to large. For example, it might be at 0%, or at 43%, or at 88%, or at 100%. The clutch slip torque is adjusted using the feedback control system so that the measured speed of the rear wheels matches the desired speed of the rear wheels.

When the work vehicle 20 starts to take turn, the steering angle is greater than zero. The front drive shaft 26 may continue to receive the first portion of the power from the transmission 23. The drive clutch 30, which is a rear wheel drive clutch, may slip, and the rear drive shaft 27 may receive a decreased second portion of power (torque) from the transmission 23. In general, the processor 54 executes the clutch control algorithm 524 to decrease the engagement of the drive clutch 30, based on the signal from the first sensor 42, the signal from the second sensor 44, and the signal from the third sensor 46, to allow the drive clutch 30 to slip to ensure the average speed of the rear wheels, which is slower than the average speed of the front wheels, approaches to the desired (average) rear wheel speed. The drive clutch 30 does not have to be fully disengaged. For an example, when the work vehicle 20 is turning a tight corner, the front wheel speed (e.g., average between the left and right front wheels) is 5 mph. The controller 50 calculates, based on the signals from the first, second, and third sensors 42, 44, 46, a desired rear wheel speed (e.g., average between the left and right rear wheel) is 4 mph. If the third sensor 46 measures the rear wheel speed at 4.5 mph, the slip torque of the clutch may need to be decreased. If the third sensor measures the rear wheel speed at 3 mph, the slip torque of the clutch may need to be increased. The clutch control algorithm 524, based on the closed loop control, can modulate the slip torque of the drive clutch 30 to change the rear wheel speed.

However, optionally, when the steering angle is greater than zero and below a deadband (e.g., ten degrees), the processor 54 may not execute the clutch control algorithm 524 to decrease the engagement of the drive clutch 30, once the processor 54 receive signal indicative of the steering angle from the first sensor 42. In another word, if the steering angle is smaller than pre-determined degrees, it may not be necessary to run the clutch control algorithm 524 to determine the engagement in the extent between the fully engaged position and the fully disengaged position. As shown in FIG. 2D and Table 1-1, for steering angles with a magnitude less than ten degrees the (average) ideal rear wheel speed is the (average) front wheel speed. The deadband in another implementation may be other pre-determined value. In some implementations, the deadband is changeable in response to the condition of the work vehicle 20 or environment in a real-time. For example, the condition of the work vehicle/environment includes a slip between the ground and front and/or rear wheels. The processor 54 is, through the clutch control algorithm 542, configured to adjust the deadband in response to a value of the wheel slip between the ground and at least one of the front wheels and rear wheels. The slip may be quantified by slip ratio. A slip speed is equal to wheel speed subtract ground speed. The slip ratio is equal to the slip speed divided by wheel speed. Here, the slip ratio may be referred to an average slip ratio and the wheel speed may be referred to an average front wheel speed, an average rear wheel speed, or average front wheel and rear wheel speed. If the value of slip ratio is low, then the deadband should be small, for example, between 7%-10%, depending on whether there is a designed overspeed. This small deadband might occur on a firm surface such as concrete or asphalt road. As the value of slip ratio increases, such as the work vehicle 20 entering different road condition, then the deadband could be increased. This might occur when the work vehicle 20 carries a heavy load and travels in loose soil. The processor 54 of the controller 50 receives signals from the second sensor 44, the third sensor 46, and the fourth sensor 48 and determines whether there is the front or rear wheel slip relative to the ground, based on the slip ratio. The processor 54 of the controller 50 may increase the deadband value when the slip ratio increases.

Figure 4A:
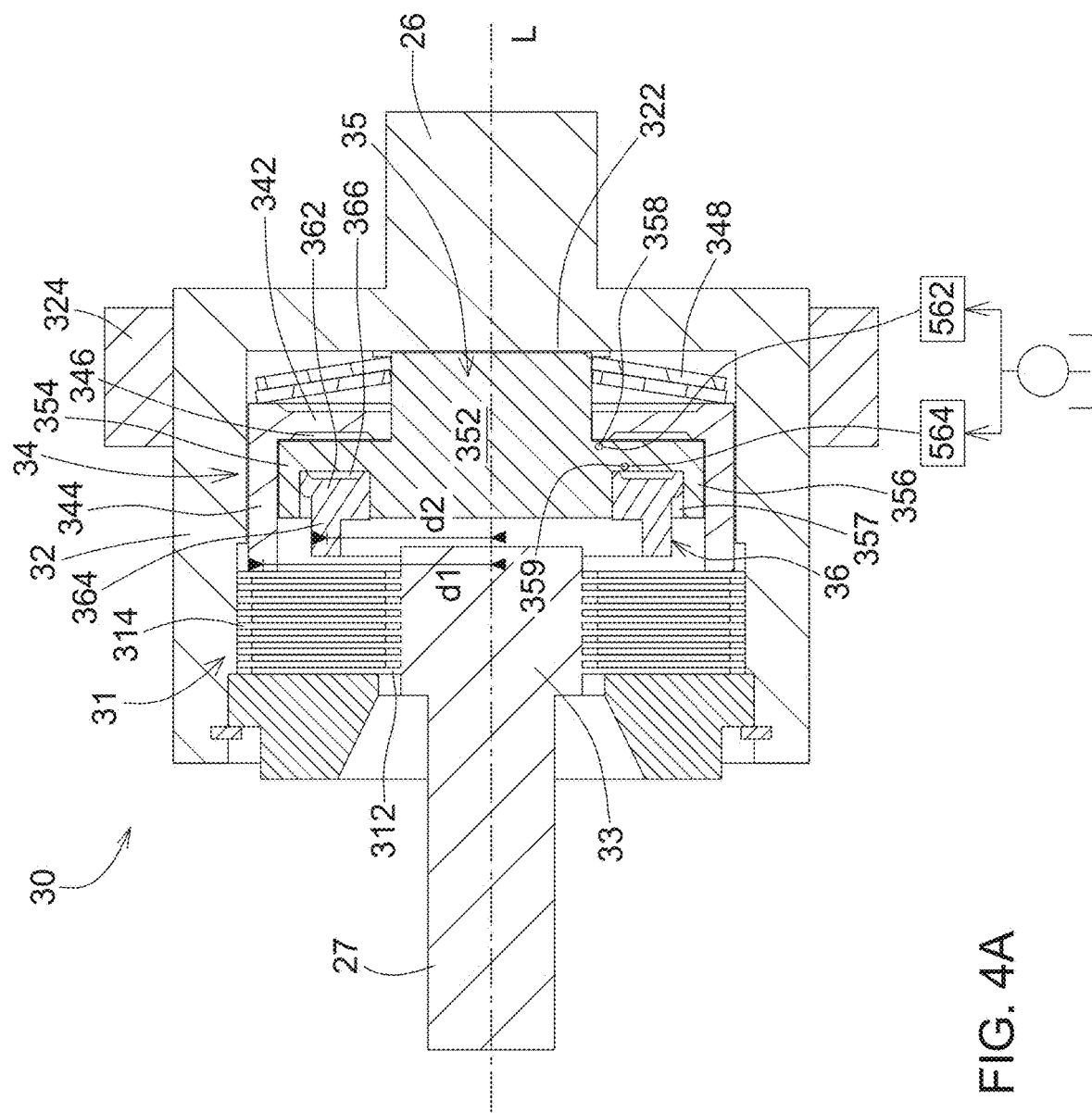
FIG. 4A is a simplified cross-sectional view of a drive clutch when the drive clutch is engaged.
Figure 4B:
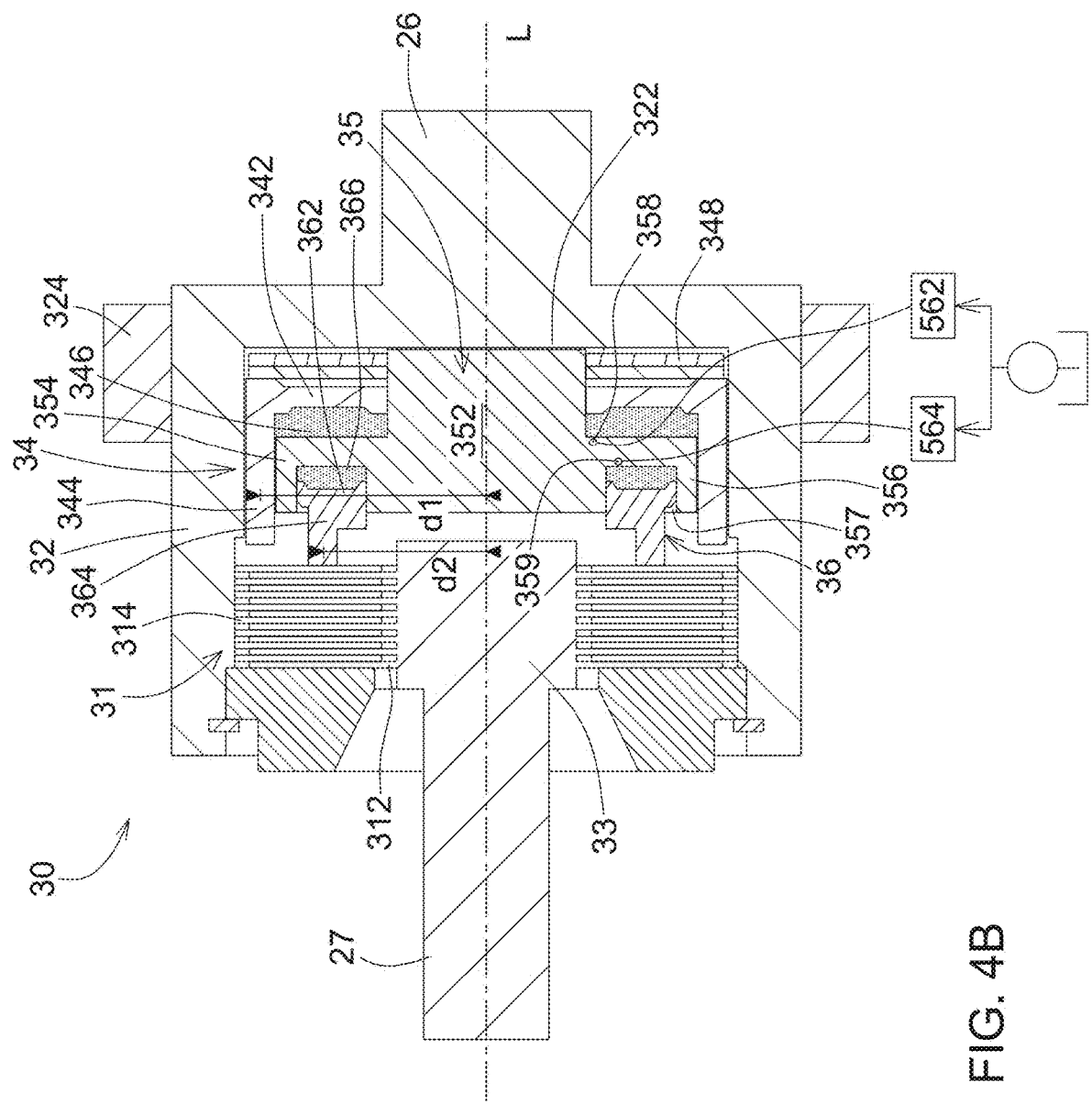
FIG. 4B is a simplified cross-sectional view of the drive clutch when the drive clutch of FIG. 4A is disengaged.
Figure 4C:
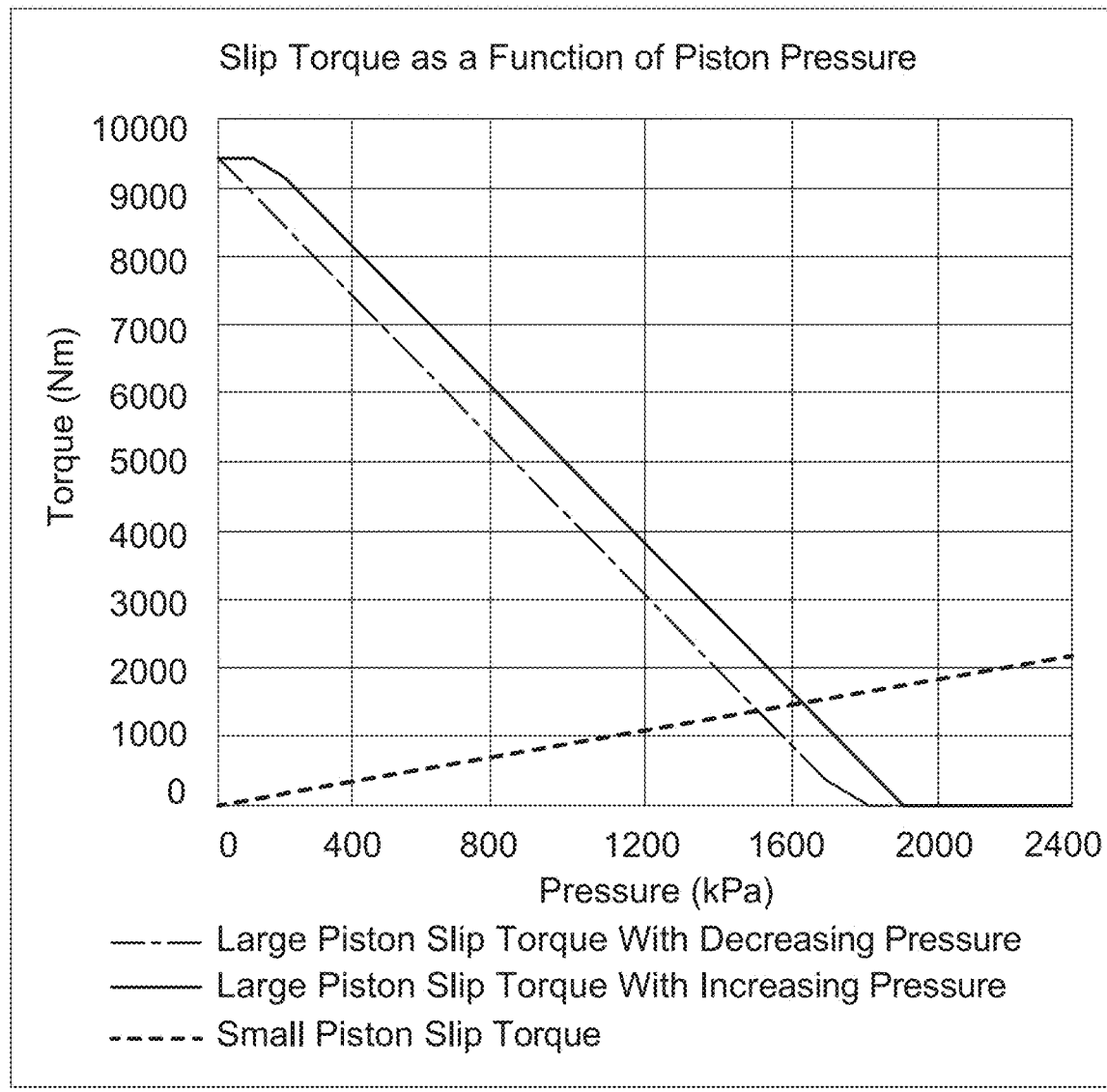
FIG. 4C is a demonstrative graph showing a large piston (first) slip torque and small piston (second) slip torque vary as function of piston pressure (hydraulic pressure applied to the pistons).

FIG. 4A is a simplified cross-sectional view of a drive clutch 30 when is engaged. In this example, the drive clutch 30 is spring applied, and hydraulic fluid does not enter the drive clutch to disengage the drive clutch 30. FIG. 4B is a simplified cross-sectional view of the drive clutch when pressurized hydraulic fluid enters the drive clutch 30. Referring to FIGS. 4A-4C, the drive clutch 30 is a dual-piston clutch for a hydraulic system; however, in another embodiment, the drive clutch 30 may be single-piston clutch. It is also noted that the dual-piston clutch structure disclosed herein may be used in another application other than the drive clutch 30 between the front drive shaft 26 (a type of a first shaft) and rear drive shaft 27 (a type of a second shaft).

The drive clutch 30 of the work vehicle 20 may include a clutch pack 31, a drum 32, a hub 33, a first piston 34, a piston guide 35, and a second piston 36. The clutch pack 31 includes at least one spacer plate 312 and at least one friction disk 314. As shown in FIGS. 4A and 4B, there are multiple spacer plates 312 and friction disks 314. The drum 32 is configured to rotate about an axis L with the front drive shaft 26 (a first shaft) coaxially mounted on and being splined on an inner periphery to receive the spacer plates 312. The hub 33 is configured to rotate about the axis L, disposed within an interior of the drum 32, coupled to the rear drive shaft 27 (a second shaft), and being splined to receive the friction disks 314 arranged alternatively with the spacer plates 312.

The first piston 34 has a first end wall 342 and a first engaging portion 344 extending axially from the first end wall 342 toward the clutch pack 31. The first engaging portion 344 may be configured as a ring-shape wall integrally extending from the periphery of the first end wall 342. The first piston 34 is configured to move toward the clutch pack 31 to engage the spacer plates 312 and the friction disks 314 or configured to move away from the clutch pack 31 to disengage the spacer plates 312 and the friction disks 314, driven by the hydraulic fluid. In this embodiment, a spring 348 is disposed between the first piston 34 and a closed end 322 of the drum 32. As shown in FIG. 4A, the spring 348 is configured to bias the first piston 34 toward the clutch pack 31 to engage the first piston 34 toward the spacer plates 312 and the friction disks 314 with a first slip torque. The first slip torque is defined as a torque threshold value that, if there were only one piston (i.e., the first piston 34), the drive clutch 30 starts to slip.

The piston guide 35 has a guide body 352 extending axially from the closed end 322 of the drum 32, passing through the first end wall 342 of the first piston 34, and extending radially to an inner periphery of the first piston 34 to form a chamber wall 354. The chamber wall 354 and the first end wall 342 of the first piston 34 form a first chamber 346 which is variable in response to the movement of the first piston 34. The piston guide 35 may include a first opening 358 disposed corresponding to the first chamber 346 for a first pressurized fluid flowing therefrom. In a non-limiting example, the first opening 358 may be located at the guide body 352 or the chamber wall 354. When a first pressurized fluid enters the first chamber 346, a force from the first pressurized fluid acting on the first piston 34 is opposite to a bias force from the spring 348 acting on the first piston 34 (shown in FIG. 4B), and the first slip torque decreases (shown in FIG. 4C). When the first slip torque decreases to zero, the first piston 34 is disengaged from the clutch pack 31. In this implementation, the first chamber 346 is hydraulically connected to a first flow control valve 562 of the clutch controller 56. The first flow control valve 562 may be a proportional solenoid valve. The first flow control valve 562 is disposed between a pump and the drive clutch 30. The controller 50 is configured to control the first flow control valve 562 to modulate the first slip torque by changing the hydraulic pressure and volume entering the first chamber 346.

The second piston 36 is disposed on another side of the chamber wall 354. Adjacent to a radial end of the chamber wall 354, the chamber wall 354 axially extends an extension 356 to form a recess 357 to receive the second piston 36. The second piston 36 has a second end wall 362 and a second engaging portion 364 extending axially from the second end wall 362 toward the clutch pack 31. The second piston 36 is configured to move toward the clutch pack 31 to engage the spacer plates 312 and the friction disks 314. The second piston 36 and the piston guide 35 form a second chamber 366 which is variable in response to the movement of the second piston 36. The piston guide 35 may include a second opening 359 disposed corresponding to the second chamber 366 for a second pressurized fluid flowing therefrom. In a non-limiting example, the second opening 359 may be located at the guide body 352 or the chamber wall 354. When a second pressurized fluid enters the second chamber 366, a force from the second pressurized fluid moves the second piston 36 toward the clutch pack 31 to engage the spacer plates 312 and the friction disks 314, as shown in FIG. 4B. In contrast to the first hydraulic fluid entering the first piston 34, the second hydraulic fluid entering the second piston 36 increases the second slip torque. There may be no object actively acting on the second piston 36 to move the second piston 36 away from the clutch pack 31. Because there is no Belleville Spring (return spring) bias the second piston 36, the second piston 36 may have a smooth or fine operation. The second slip torque would not be as sensitive to the pressure as the first slip torque, as shown in FIG. 4C. The return spring may not be needed here because slip velocity is small. The second slip torque is defined as a torque threshold value that, if there were only one piston (i.e., the second piston 36), the drive clutch 30 starts to slip. In this implementation, the second chamber 366 is hydraulically connected to a second flow control valve 564 of the clutch controller 56. The second flow control valve 564 may be a proportional solenoid valve. The controller 50 is configured to control the second flow control valve 564 to modulate the second slip torque by changing the hydraulic pressure and volume entering the second chamber 366.

As shown in FIGS. 4A and 4B, a first distance d1 between the first engaging portion 344 of the first piston 34 and the axis L is greater than a second distance d2 between the second engaging portion 364 of the second piston 36 and the axis L. In other words, the first piston 34 may have longer lever arm than does the second piston 36.

Referring to FIG. 4C, the first engaging portion 344 of the first piston 34 is configured to engage the clutch pack 31 with the first slip torque. The second engaging portion 364 of the second piston 36 is configured to engage the clutch pack 31 with the second slip torque. The first piston 34 pushes at a large diameter on the clutch pack 31 and has a larger torque capacity than the second piston 36 (small piston). A maximum value of the first slip torque is greater than a maximum of the second slip torque. The second piston 36 is configured to perform finer adjustment in the second slip torque than an adjustment of the first slip torque performed by the first piston 34. The clutch pack 31 starts to slip when an external torque (in this example, from the transmission 23) applied to the clutch pack 31 exceeds a total slip torque, which is defined by the first slip torque and the second slip torque and is decreasing due to an increase hydraulic pressure at the first chamber 346 and/or a decrease hydraulic pressure at the second chamber 366.

As discussed, the first piston 34 is spring engaged. Because the spring 348, which is a Belleville spring or a conical spring, tends to be jumpy as it slips radially against the mating parts, the first piston 34 may not have a consistent equation for slip torque as a function of clutch pressure. The difference of slip torque with increasing verses with decreasing pressure is due to friction between the application springs 348 to the first piston 34 and the first piston 34 to an inner cylinder wall of the drum 32. As such, there will likely be notable hysteresis in the first slip torque as the pressure is increasing versus as the pressure is decreasing. The gain value of torque/pressure will have a large magnitude. On the contrary, the second piston 36 is pressure engaged. The second piston 36 pushes on a smaller area of the clutch pack 31 and will have a smaller gain value for torque/pressure. Therefore, the second piston 36 is for fine tuning the slip torque. In this implementation, both the first piston 34 and the second piston 36 may require respective electrically controlled pressure valves, such as the first flow control valve 562 and the second flow control valve 564. The controller 50 is configured to control the first flow control valve 562 and second flow control valve 564 to modulate a total slip torque generated by the first piston 34 and the second piston 36. FIG. 4A may illustrate that the drive clutch 30 is in a park brake state and/or the power source 22 (e.g., engine) is off. The drive clutch 30 is a spring applied and the hydraulic pressure releases.

When the clutch shown in FIGS. 4A, 4B is the drive clutch 30, the drum 32 may include a driven component 324 disposed on the exterior of the drum 32 for rotating the drum 32. The driven component 324 may be a gear engaging other component of the transmission 23. The first shaft, which is the front drive shaft 26 in this case, and the second shaft, which is the rear drive shaft 27 in this case, are output shafts. Referring to FIGS. 1, 3, 4A, 4B, when the steering angle is greater than zero, the processor 54 executes the clutch control algorithm 524 to modulate a pressure of the hydraulic fluid to decrease the engagement between the spacer plates 312 and the friction disks 314, based on the signal from the first sensor 42, the signal from the second sensor 44, and the signal from the third sensor 46, and optionally, the fourth sensor 48, to allow the drive clutch 30 to slip to ensure an average speed of the rear wheels RL, RR slower than an average speed of the front wheels FL, FR. Referring to FIGS. 3 and 4B, the processor 54 may execute the clutch control algorithm 524, based on the signal from the first sensor 42, the signal from the second sensor 44, the signal from the third sensor 46, and optionally, the fourth sensor 48, to increase the pressure of the hydraulic fluid in the first chamber 346 and to move the first piston 34 against a bias force from the spring 348 to decrease the engagement between the spacer plates 312 and the friction disks 314.

Additionally, the processor 54 may execute the clutch control algorithm 524, based on the signal from the first sensor 42, the signal from the second sensor 44, the signal from the third sensor 46, and optionally, the fourth sensor 48, to increase the pressure of the hydraulic fluid in the second chamber 366 to move the second piston 36 toward the spacer plates 312 and friction disks 314 to engage the spacer plates 312 and the friction disks 314 with a force allowing appropriate slip therebetween.

In another implementation, when the drive clutch 30 is a single-piston hydraulic clutch (not shown), which may have similar structure to the double-piston structure except there is no second piston and the piston guide designed to interact with the second piston, the processor 54 may executes the clutch control algorithm 524 to increase the pressure of the hydraulic fluid in a chamber, based on the signal from the first sensor 42, the signal from the second sensor 44, and the signal from the third sensor 46, to move the single piston (not shown) against a bias force from a spring to decrease the engagement between the spacer plates 312 and the friction disks 314. As such, the controller 50 can also modulate a pressure of the hydraulic fluid to decrease the engagement between the spacer plates 312 and the friction disks 314, based on the signal from the first sensor 42, the signal from the second sensor 44, the signal from the third sensor 46, and optionally, the fourth sensor 48, even though the hysteresis effect may exist.

In another implementation, the drive clutch 30 is an electromagnetic clutch. The field coils may be installed on the piston (not shown). When the steering angle is greater than zero, the processor 54 is operable to execute the clutch control algorithm 524 to modulate, based on the signal from the first sensor and the signal from the second sensor and the signal from the third sensor, the electric current feeding the electromagnetic clutch to allow the drive clutch 30 to slip to ensure an average speed of the rear wheels LR, RR, which are slower than an average speed of the front wheels FL, FR. The controller 50 may control a power supply to change the electric current feeding.

Optionally, the processor 54 may execute the clutch control algorithm 524, based on the signal from the first sensor 42, the signal from the second sensor 44, and the signal from the third sensor 46, to decrease the speed of the rear wheels and via the clutch controller 56 and to further change the speed of the front wheel and the speed of the rear wheels via the front brakes 242 and rear brakes 252 controlled by the brake controller 58. The brake controller 58 may include another hydraulic circuit that control the brake disks, to independently decrease the speed of the front wheels FL, FR and rear wheels RL, RR. By the change in engagement of drive clutch 30 and the activation of the front brakes 242 and rear brakes 252, the work vehicle 20 may be allowed for a tight turn. In one implementation, the processor 54 is operable to execute the clutch control algorithm 524 to activate the front left brake, the right brake, the rear left brake, and right brakes independently. When the work vehicle 20 turns, the processor 54 executes the clutch control algorithm 524 to activate at least one of the front left brake and the front right brake to cause the speed of one of the front wheels FL, FR which is inside during turning, slower than the speed of the other front wheel FL, FR which is outside during turning, activate at least one of the rear left brake and the rear right brake to cause the speed of one of the rear wheels RL, RR, which is inside during turning, slower than the speed of the other rear wheel RL, RR, which is outside during turning, and decrease the engagement of the drive clutch 30 to significantly reduce the turning radius.

For example, when the work vehicle 20 is steering to the left, the processor 54 of the controller 52 may execute the clutch control algorithm 524 to activate may activate a left brake of the front brakes 242 to decrease the front left wheel FL speed and activate a left brake of the rear brakes 252 to decrease the rear left wheel RL speed, and then decrease the engagement of the rear drive clutch 30 to further decrease the speed of the rear left wheel RL and rear right wheel RR. As such, the front end of the work vehicle 20 can pull the work vehicle around in a corner with small turning radius. One instance of the small turning radius is needed when the work vehicle has a tight turn that may reach its limit. The desired small turning radius may even be smaller than geometry of the steering system of the work vehicle 20 allows. In some cases, the processor 54 is operable to execute the clutch control algorithm 524 to activate one of the rear brakes 252 (applied to the inside rear wheel) and to decrease the engagement of the rear drive clutch 30 to collectively stop the inside rear wheel, and the outside front wheel remain full speed (without corresponding front brake 242 applied). Therefore, with processor 54 executing the clutch control algorithm 524 to activate one side of the front brakes 242 and one side of the rear brakes 252, the work vehicle is able to turn tighter than without the aforementioned brake control.

Figure 5:
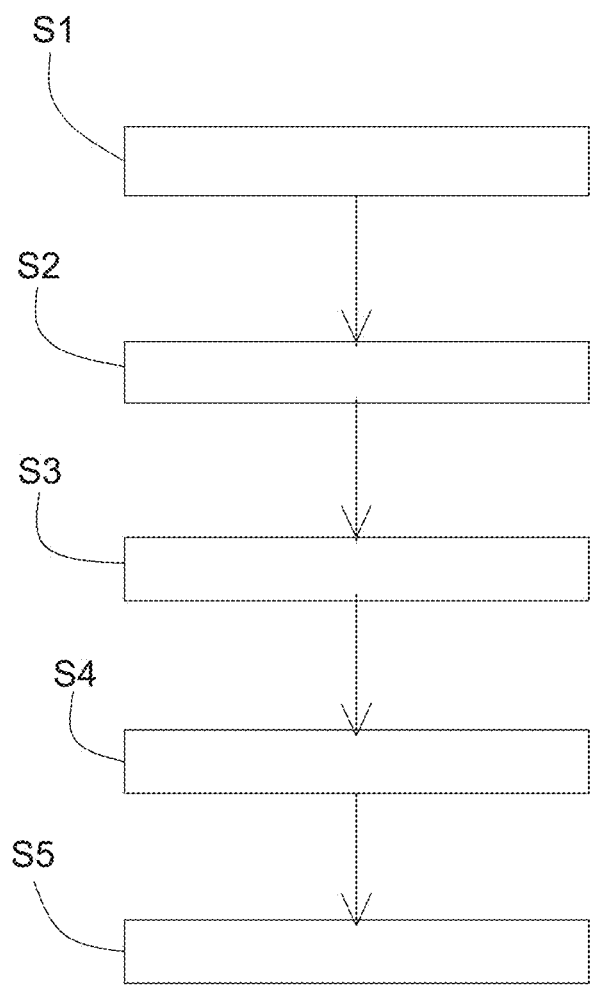
FIG. 5 is a flow chart showing the method of controlling a drive clutch.

Referring to FIG. 5, a method of controlling a drive clutch of a work vehicle is disclosed. The drive clutch is operatively positioned between the rear axle and the power source.

S1: measuring a steering angle of front wheels and transmitting a signal indicative of the steering angle by a first sensor.

S2: measuring a speed the front wheels and transmitting a signal indicative of the speed of the front wheels by a second sensor.

S3: measuring a speed of the rear wheels and transmit a signal indicative of the speed of the rear wheels by a third sensor.

S4: receiving the signal from the first sensor and the signal from the second sensor, the signal from the third sensor by a controller.

S5: determining an engagement between the fully engaged position and a fully disengaged position of the drive clutch based on the signal from the first sensor and the signal from the second sensor, and the signal from the third sensor. S5 may further include comparing a desired rear wheel speed, which is calculated based on the signal from the first sensor and the signal from the second sensor, with the speed of rear wheel to output a control signal to change the engagement of the drive clutch based on a result of comparing the desired speed of the rear wheels and the speed of the rear wheels. For such comparison, as discussed, the controller determines an ideal rear turning radius and an ideal front turning radius based on the signal from the first sensor and a geometry data stored in the memory. The controller later calculates a desired rear wheel speed based on the ratio of ideal rear turning radius and an ideal front turning radius multiplied by the measured front wheel speed. Then the desired rear wheel speed is compared with the measured rear wheel speed.

Figure 6:
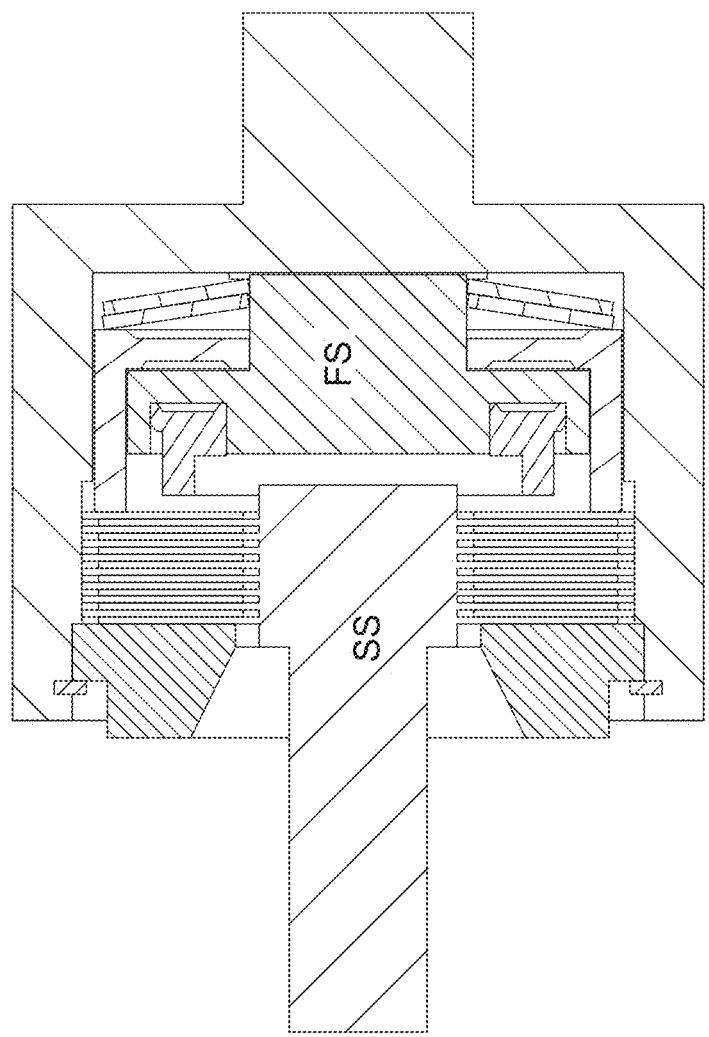
FIG. 6 is a simplified cross-sectional view of a clutch having a first shaft, which is an input shaft, and a second shaft, which is an output shaft.

It is noted that the clutch illustrated in FIGS. 4A, 4B can be a clutch other than the drive clutch 30. The clutch is a dual piston clutch and may have components similar to the clutch pack 31, a drum 32, the hub 33, the first piston 34, the piston guide 35, and the second piston 36 in FIGS. 4A, 4B. Referring to FIG. 6, the first shaft FS, unlike the front drive shaft 26 shown in FIGS. 4A and 4B, is an input shaft. The second shaft SS is an output shaft. In this clutch implementation, the drum does not have a driven component 324 as shown in FIGS. 4A, 4B to receive a power flow. Instead, the first shaft FS receives power flow from another component. The controller 50 determines the engagement between the fully engaged position and a fully disengaged position based on the signal from the first sensor, the signal from the second sensor, and the signal from the third sensor to further determine a portion of the power flow passing through the second shaft SS. For one example, this dual piston clutch is a power take-off clutch (PTO clutch). The dual piston PTO clutch could allow for a second (small) piston with a small torque for engaging implements and detecting if there is a load. The first (larger) piston would be available achieve the required torque reserve when the engine is at full torque. For another example, this dual piston clutch is traction clutch. The traction clutch of a tractor might have a dual piston design to allow for fine control of torque in low torque applications such as backing up to an implement. It could have the larger piston for full torque applications.

Without in any way limiting the scope, interpretation, or application of the claims appearing below, a technical effect of one or more of the example embodiments disclosed herein is to provide a rear wheel drive clutch system that allows an appropriate slip within the drive clutch. As such, speed of the rear wheels of the work vehicle can decrease to a desired rear wheel speed, when the work vehicle takes turns. The drive clutch may be single piston, dual piston, or multiple piston hydraulic clutch. The drive clutch may be another type of drive clutch, such as an electric current feeding the electromagnetic clutch, to allow the drive clutch to slip to ensure the average speed of the rear wheels, which are slower than the average speed of the front wheels. Another technical effect of one or more of the example embodiments disclosed herein is the work vehicle can have a small turning radius when the rear wheel drive clutch and the brakes on the wheels cooperate and are controlled by the controller. It is noted that even the disclosed drive clutch alone may allow the work vehicle to have a small turning radius. Another technical effect of one or more of the example embodiments disclosed herein is to provide a hydraulic dual piston clutch, which includes a first piston providing a course (range) adjustment in the first slip torque and a second piston provide a fine adjustment in the second slip torque. The clutch can be a drive clutch or other type of clutch in the work vehicle.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally," "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A hydraulic clutch of a work vehicle, comprising:
    a clutch pack having a spacer plate and a friction disk;
    a drum configured to rotate about an axis with a first shaft coaxially mounted on and the drum being splined on an inner periphery of the drum to receive the spacer plates;
    a hub configured to rotate about the axis, disposed within an interior of the drum, coupled to a second shaft, and being splined to receive the friction disk arranged alternatively with the spacer plate;
    a first piston having a first end wall and a first engaging portion extending axially from the first end wall toward the clutch pack and configured to move toward the clutch pack to engage the spacer plate and the friction disk or configured to move away from the clutch pack to disengage the spacer plate and the friction disk;
    a piston guide having a guide body extending axially from a closed end of the drum, passing through the first end wall of the first piston, and extending radially to an inner periphery of the first piston to form a chamber wall, wherein the chamber wall and the first end wall of the first piston form a first chamber which is variable in response to a movement of the first piston;
    a second piston disposed adjacent to the chamber wall, having a second end wall and a second engaging portion extending axially from the second end wall toward the clutch pack, and configured to move toward the clutch pack to engage the spacer plate and the friction disk, wherein the second piston and the piston guide form a second chamber which is variable in response to a movement of the second piston; and
    a spring disposed between the first piston and the closed end of the drum and configured to bias the first piston toward the clutch pack to engage the first piston toward the spacer plate and the friction disk with a first slip torque;
    wherein when a first pressurized fluid enters the first chamber, a force from the first pressurized fluid acting on the first piston is opposite to a bias force from the spring acting on the first piston, and the first slip torque decreases.

2. The hydraulic clutch of claim 1, wherein adjacent to a radial end of the chamber wall, the chamber wall axially extends an extension to form a recess to receive the second piston.

3. The hydraulic clutch of claim 1, wherein the first engaging portion of the first piston is configured to engage the clutch pack with a first slip torque, the second engaging portion of the second piston is configured to engage the clutch pack with a second slip torque.

4. The hydraulic clutch of claim 3, wherein a first distance between the first engaging portion of the first piston and the axis is greater than a second distance between the second engaging portion of the second piston and the axis.

5. The hydraulic clutch of claim 4, a maximum value of the first slip torque is greater than a maximum of the second slip torque.

6. The hydraulic clutch of claim 3, wherein the clutch pack starts to slip when an external torque applied to the clutch pack exceeds a total slip torque, which is defined by the first slip torque and the second slip torque.

7. The hydraulic clutch of claim 1, wherein when the first slip torque decreases to zero, the first piston is disengaged from the clutch pack.

8. The hydraulic clutch of claim 1, wherein when a second pressurized fluid enters the second chamber, a force from the second pressurized fluid acting on the second end wall to move the second piston toward the clutch pack to engage the spacer plate and the friction disk.

9. The hydraulic clutch of claim 1, wherein the piston guide includes a first opening disposed corresponding to the first chamber for a first pressurized fluid flowing therefrom and a second opening disposed corresponding to the second chamber for a second pressurized fluid flowing therefrom.

10. The hydraulic clutch of claim 1, further comprising a driven component disposed on the drum for rotating the drum, and wherein the first shaft and the second shaft are output shafts.

11. The hydraulic clutch of claim 1, wherein the first shaft is an input shaft, and the second shaft is an output shaft.

12. The hydraulic clutch of claim 1, wherein there is no spring acting on the second piston to move the second piston away from the clutch pack.

13. A hydraulic clutch of a work vehicle, comprising:
    a clutch pack having a spacer plate and a friction disk;
    a drum configured to rotate about an axis with a first shaft coaxially mounted on and the drum being splined on an inner periphery of the drum to receive the spacer plates;
    a hub configured to rotate about the axis, disposed within an interior of the drum, coupled to a second shaft, and being splined to receive the friction disk arranged alternatively with the spacer plate;
    a first piston having a first end wall and a first engaging portion extending axially from the first end wall toward the clutch pack and configured to move toward the clutch pack to engage the spacer plate and the friction disk or configured to move away from the clutch pack to disengage the spacer plate and the friction disk;
    a piston guide having a guide body extending axially from a closed end of the drum, passing through the first end wall of the first piston, and extending radially to an inner periphery of the first piston to form a chamber wall, wherein the chamber wall and the first end wall of the first piston form a first chamber which is variable in response to a movement of the first piston; and
    a second piston disposed adjacent to the chamber wall, having a second end wall and a second engaging portion extending axially from the second end wall toward the clutch pack, and configured to move toward the clutch pack to engage the spacer plate and the friction disk, wherein the second piston and the piston guide form a second chamber which is variable in response to a movement of the second piston;
    wherein the first chamber is hydraulically connected to a first flow control valve and the second chamber is hydraulically connected to a second flow control valve, and a controller is configured to control the first flow control valve and second flow control valve to modulate a total slip torque generated by the first piston and the second piston.

14. The hydraulic clutch of claim 13, wherein adjacent to a radial end of the chamber wall, the chamber wall axially extends an extension to form a recess to receive the second piston.

15. The hydraulic clutch of claim 13, wherein the first engaging portion of the first piston is configured to engage the clutch pack with a first slip torque, the second engaging portion of the second piston is configured to engage the clutch pack with a second slip torque.

16. The hydraulic clutch of claim 13, further comprising a driven component disposed on the drum for rotating the drum, and wherein the first shaft and the second shaft are output shafts.

17. A hydraulic clutch of a work vehicle, comprising:
a clutch pack having a spacer plate and a friction disk;
a drum configured to rotate about an axis with a first shaft coaxially mounted on and the drum being splined on an inner periphery of the drum to receive the spacer plates;
a hub configured to rotate about the axis, disposed within an interior of the drum, coupled to a second shaft, and being splined to receive the friction disk arranged alternatively with the spacer plate;
a first piston having a first end wall and a first engaging portion extending axially from the first end wall toward the clutch pack and configured to move toward the clutch pack to engage the spacer plate and the friction disk or configured to move away from the clutch pack to disengage the spacer plate and the friction disk;
a piston guide having a guide body extending axially from a closed end of the drum, passing through the first end wall of the first piston, and extending radially to an inner periphery of the first piston to form a chamber wall, wherein the chamber wall and the first end wall of the first piston form a first chamber which is variable in response to a movement of the first piston; and
a second piston disposed adjacent to the chamber wall, having a second end wall and a second engaging portion extending axially from the second end wall toward the clutch pack, and configured to move toward the clutch pack to engage the spacer plate and the friction disk, wherein the second piston and the piston guide form a second chamber which is variable in response to a movement of the second piston; and
a driven component disposed on the drum for rotating the drum, and wherein the first shaft and the second shaft are output shafts;
wherein the first shaft is a front drive shaft and the second shaft is a rear drive shaft.

18. The hydraulic clutch of claim 17, wherein adjacent to a radial end of the chamber wall, the chamber wall axially extends an extension to form a recess to receive the second piston.

19. The hydraulic clutch of claim 17, wherein the first engaging portion of the first piston is configured to engage the clutch pack with a first slip torque, the second engaging portion of the second piston is configured to engage the clutch pack with a second slip torque.

* * * * *